US009912522B2

(12) United States Patent
Srinivasaiah et al.

(10) Patent No.: US 9,912,522 B2
(45) Date of Patent: Mar. 6, 2018

(54) AUTOMATIC TASK TRACKING (71) Applicant: AppDynamics LLC, San Francisco, CA (US)

(72) Inventors: Vinay Srinivasaiah, San Carlos, CA (US); Sanjay Nagaraj, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 373 days.

(21) Appl. No.: 14/699,776

(22) Filed: Apr. 29, 2015

(65) Prior Publication Data
US 2016/0323362 A1 Nov. 3, 2016

(51) Int. Cl.
| | |
|---|---|
| G06F 15/16 | (2006.01) |
| H04L 12/24 | (2006.01) |
| G06F 11/00 | (2006.01) |
| H04L 29/08 | (2006.01) |
| G06F 9/46 | (2006.01) |
| G06F 11/34 | (2006.01) |
| G06F 11/30 | (2006.01) |

(52) U.S. Cl.
CPC .............. *H04L 41/046* (2013.01); *G06F 9/46* (2013.01); *G06F 11/00* (2013.01); *G06F 11/301* (2013.01); *G06F 11/3006* (2013.01); *G06F 11/3495* (2013.01); *H04L 41/5058* (2013.01); *H04L 67/02* (2013.01); *G06F 2201/87* (2013.01); *G06F 2201/875* (2013.01)

(58) Field of Classification Search
USPC .......................... 709/202, 203, 223, 224, 226
See application file for complete search history.

(56) References Cited

U.S. PATENT DOCUMENTS

| | | | | |
|---|---|---|---|---|
| 6,349,406 | B1* | 2/2002 | Levine ................ | G06F 11/3466 702/179 |
| 2008/0243968 | A1* | 10/2008 | Schmelter ........... | G06F 12/0253 |
| 2012/0260133 | A1* | 10/2012 | Beck ..................... | G06F 11/323 714/38.1 |
| 2014/0278626 | A1* | 9/2014 | Stollarski ......... | G06Q 10/06311 705/7.13 |
| 2014/0317592 | A1* | 10/2014 | Roy-Chowdhury ...... | G06F 8/71 717/101 |

FOREIGN PATENT DOCUMENTS

CN 103365716 A * 10/2013

* cited by examiner

*Primary Examiner* — Liangche A Wang
(74) *Attorney, Agent, or Firm* — Parker Ibrahim & Berg LLC; James M. Behmke; Stephen D. LeBarron (57) ABSTRACT

The present technology correlates tasks between multiple threads of an application. A payload consisting of a task object may be identified as part of a method. Identification of the task object may be performed using instrumentation or some other method. Once the task object is identified, the payload may be instrumented to track the task object or payload and correlate the task object with other executing threads. Instrumenting the payload may include determining the constructor of the task object and instrumenting the task object constructors to determine what creates the task object. Once the source of a task object or payload is determined, the current thread having the task object as a parameter and another thread which creates the task may be tied together as part of a business transaction.

18 Claims, 5 Drawing Sheets

AUTOMATIC TASK TRACKING

BACKGROUND

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services that provide the web application. The services may be grouped into business transactions, which may be performed by one or more threads executing on one or more application servers. Hence, monitoring a distributed business transaction is important for understanding how applications work together and in troubleshooting performance issues.

Occasionally, a chain of correlation between applications or threads will be lost when trying to string together portions of a business transaction. Ideally, each part of an application is monitored by application monitoring software. Though many application program monitoring systems monitor application callables and application runnables, they do not monitor other programming types. This makes it difficult to tie together the loose ends of an application that are not correlated to any other part of the application.

What is needed is an improved method for monitoring an application that helps correlate components that are not correlated through normal means.

SUMMARY

The present technology correlates tasks between multiple threads of an application. A payload consisting of a task object may be identified as part of a method. Identification of the task object may be performed using instrumentation or some other method. Once the task object is identified, the payload may be instrumented to track the task object or payload and correlate the task object with other executing threads. Instrumenting the payload may include determining the constructor of the task object and instrumenting the task object constructors to determine what creates the task object. Once the source of a task object or payload is determined, the current thread having the task object as a parameter and another thread which creates the task may be tied together as part of a business transaction.

In an embodiment, a method for tracking a task in a distributed business transaction may identify a payload as part of a method executed on a server by an agent executing the server. A constructor of the payload may be tracked by the agent to identify a task associated with the payload. The payload and the task may then be correlated as part of a business transaction.

An embodiment may include a system for reporting data. The system may include a processor, memory, and one or more modules stored in memory and executable by the processor. When executed, the modules may identify a payload as part of a method executed on a server by an agent executing the server, track a constructor of the payload by the agent to identify a task associated with the payload, and correlate the payload and the task as part of a business transaction.

DETAILED DESCRIPTION

The present technology correlates tasks between multiple threads of an application. A payload consisting of a task object may be identified as part of a method. Identification of the task object may be performed using instrumentation or some other method. Once the task object is identified, the payload may be instrumented to track the task object or payload and correlate the task object with other executing threads. Instrumenting the payload may include determining the constructor of the task object and instrumenting the task object constructors to determine what creates the task object. Once the source of a task object or payload is determined, the current thread having the task object as a parameter and another thread which creates the task may be tied together as part of a business transaction.

Figure 1:
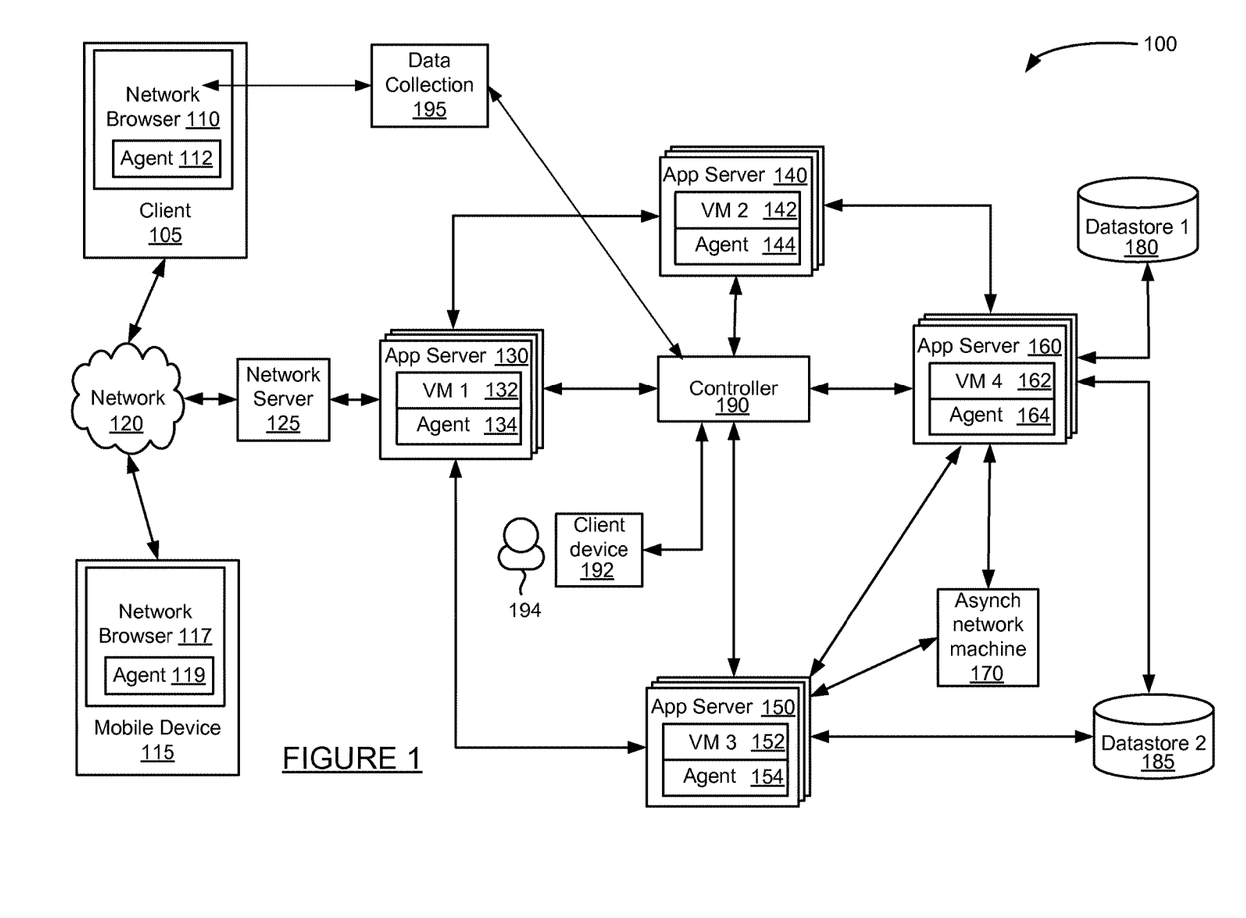
FIG. 1 illustrates a block diagram of a system for correlating task objects in a distributed business transaction.

FIG. 1 illustrates a block diagram of a system for correlating task objects in a distributed business transaction. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks.

Network server 125 is connected to network 120 and may receive and process requests received over network 120. Network server 125 may be implemented as one or more servers implementing a network service, and may be implemented on the same machine as application server 130. When network 120 is the Internet, network server 125 may be implemented as a web server. Network server 125 and application server 130 may be implemented on separate or the same server or machine Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132.

In some embodiments, server 130 may include applications and/or code other than a virtual machine. For example, server 130 may include Java code, .NET code, PHP code, Ruby code, or other code to implement applications and process requests received from a remote source.

Agent 134 on application server 130 may be installed, downloaded, embedded, or otherwise provided on application server 130. For example, agent 134 may be provided in server 130 by instrumentation of object code, downloading the application to the server, or in some other manner. Agent 134 may be executed to monitor application server 130, monitor code running in a or a virtual machine 132 (or other program, such as a PHP program), and communicate with byte instrumented code on application server 130, virtual machine 132 or another application on application server 130. Agent 134 may detect operations such as receiving calls and sending requests by application server 130 and virtual machine 132. Agent 134 may receive data, for example from instrumented code of the virtual machine 132, and process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (memory, processor, and so on). A tier of nodes may include a plurality of nodes which may process a similar business transaction, may be located on the same server, may be associated with each other in some other way, or may not be associated with each other.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878,919, titled "Monitoring Distributed Web Application Transactions," filed on Sep. 9, 2010, U.S. patent application Ser. No. 13/189,360, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive runtime data, including data associated with monitoring client requests at client 105 and mobile device 115, from data collection server 160. In some embodiments, controller 190 may receive runtime data from each of agents 112, 119, 134, 144 and 154. Controller 190 may associate portions of business transaction data, communicate with agents to configure collection of runtime data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as content page, e.g. a web page, which may be provided to and rendered through a network browser application on client device 192.

Figure 2:
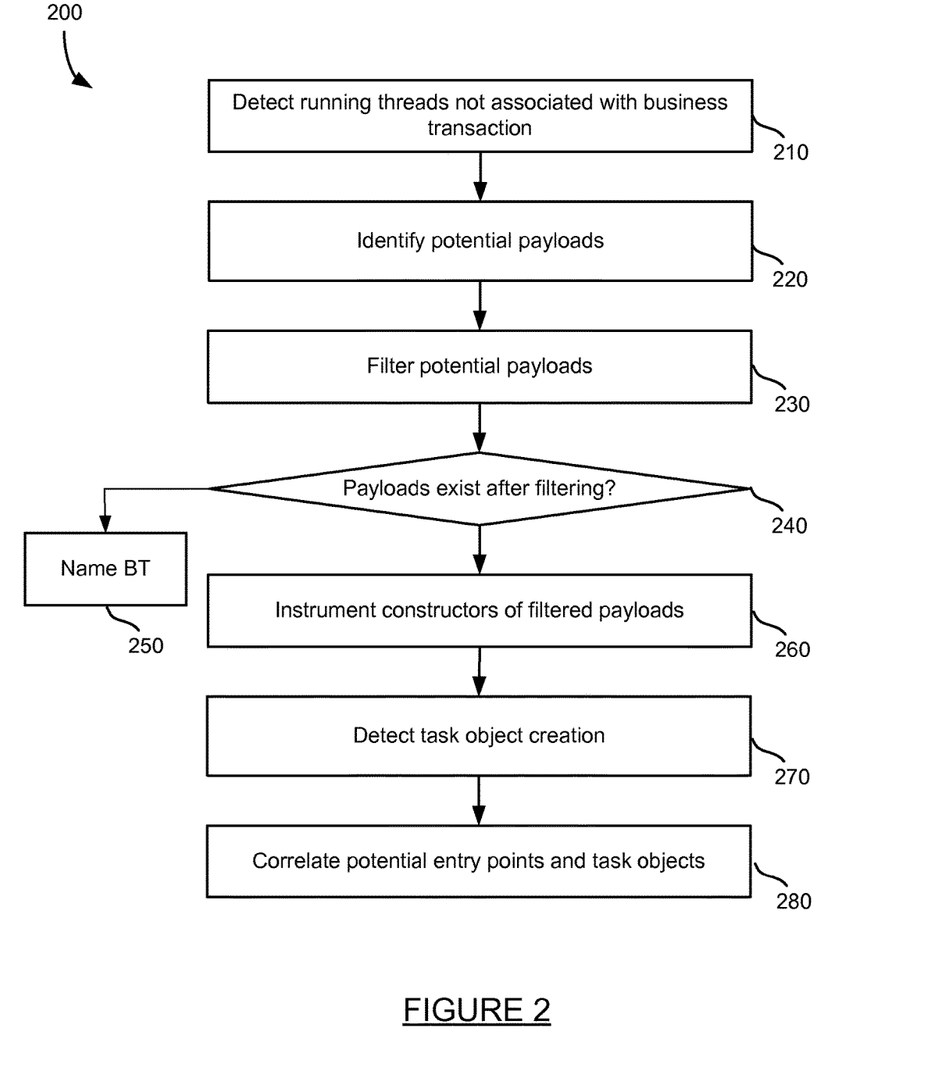
FIG. 2 illustrates a method for automatically tracking payloads.

FIG. 2 illustrates a method for automatically tracking payloads. The method of FIG. 2 may be performed by an agent executing on an application server. In some instances, the method of FIG. 2 may be performed all or in part by controller 190. Threads executing for an application and not associated with a business transaction are detected at step 210. It is important that when monitoring an application that the entire application is being monitored. Otherwise, problems may occur that are not detectable.

Executing threads which are not associated with any business transaction may be detected in several ways. In some instances, a thread pool may be instrumented to determine what is being run by each executing threads and thread pool. By instrumenting the thread pool itself, each running thread may be identified as well as what business transactions, if any, each thread is associated with. In some instances, a thread itself may be sampled, for example by performing a thread dump. This may be done periodically to determine if one or more threads are associated with a business transaction After identifying that a thread is not associated with a business transaction, potential payloads within the particular thread are identified at step 220. In some instances, payloads containing task objects are desirable to identify as they may be used to correlate the current thread (the thread not associated with a business transaction) with another thread that is associated with a particular business transaction. The payloads for correlation may be provided based on the constructor of the payload (i.e., task object). Identifying potential payloads may include collecting information for the threads, identifying a call chain for the thread, and processing that information. More details for identifying a potential payload are discussed with respect to the method of FIG. 3.

Once potential payloads are identified, the set of potential payloads may be filtered at step 230. Since there may be several potential payloads, it may be possible to remove some as candidates from the set of payloads to save time in tracking the payloads. Filtering the payloads may include applying rules to remove payloads from consideration based on the assumption that a payload of interest is created by a thread outside the current thread. Filtering potential payloads is discussed in more detail below with respect to the method of FIG. 4.

A determination is made as to whether any payloads exist after filtering the payloads at step 240. If filtering the payloads resulted in removing all identified payloads from consideration, then the method or class containing the payload may be named as a business transaction itself at step 250. This provides a user with a way to monitor the class since it cannot be correlated to any other part of the application.

If there are one or more payloads that exist after the filtering, instructors of the filtered payloads are instrumented at step 260. The constructors may be determined from the payloads themselves, and are monitored to determine where the payload is generated from. Once the payload constructors are instrumented, one or more agents installed on the application may monitor the constructors to determine whether any other thread constructs a task object associated with the filtered payload.

The payload or task object creation may then be detected at step 270. Task object creation is detected as result of instrumenting the constructor of a filtered payload. The potential entry point on a different thread is correlated to the task object in the current thread without a business transaction at step 280. At this point, the thread previously not associate with a business transaction may be associated with a business transaction that is assigned to another thread which creates the task object identified in the current thread.

Figure 3:
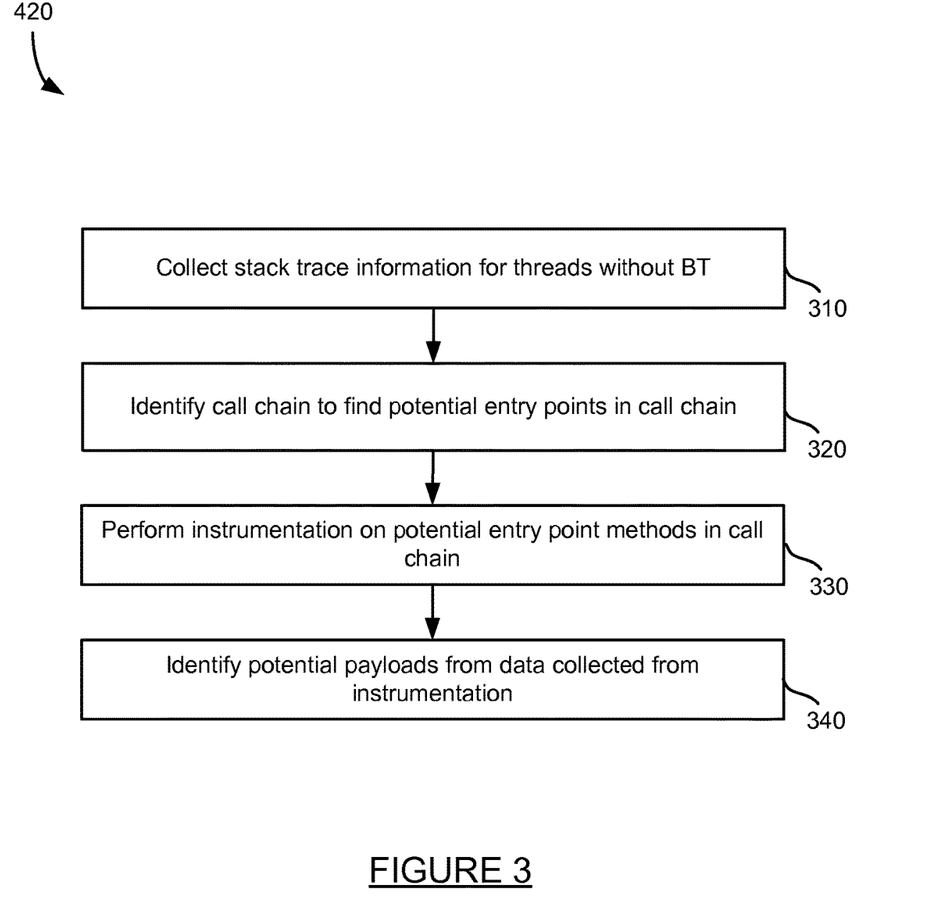
FIG. 3 illustrates a method for identifying potential payloads.

FIG. 3 illustrates a method for identifying potential payloads. The method of FIG. 3 provides more detail for step 220 the method of FIG. 2. Stack trace information for threads without a business transaction is collected at step 310. The stack trace information provides information for each call and method executed as part of the threat. A call chain may then be identified to find potential entry points into thread at step 320. The call chain may include a series of calls and methods executed by the thread. For each call and method, a potential payload may exist.

Instrumentation is performed on the potential entry point method in the call chain at step 330. The instrumentation may be performed to determine what is coming into the particular method. For example, the instrumentation may monitor the first method, a second method, a do( )method, or other parts of the call chain to determine a payload. The payload may include a field, parameter, or an invoked object. Potential payloads are then identified from the data collected from the instrumentation at step 340. The payload may include task objects created by a different thread. Though several of the payloads may not be useful in correlating the present thread to a business transaction, further investigation of the payloads is needed to determine this for certain. This process is performed by filtering the task objects or payloads as discussed with respect to the method of FIG. 4.

Figure 4:
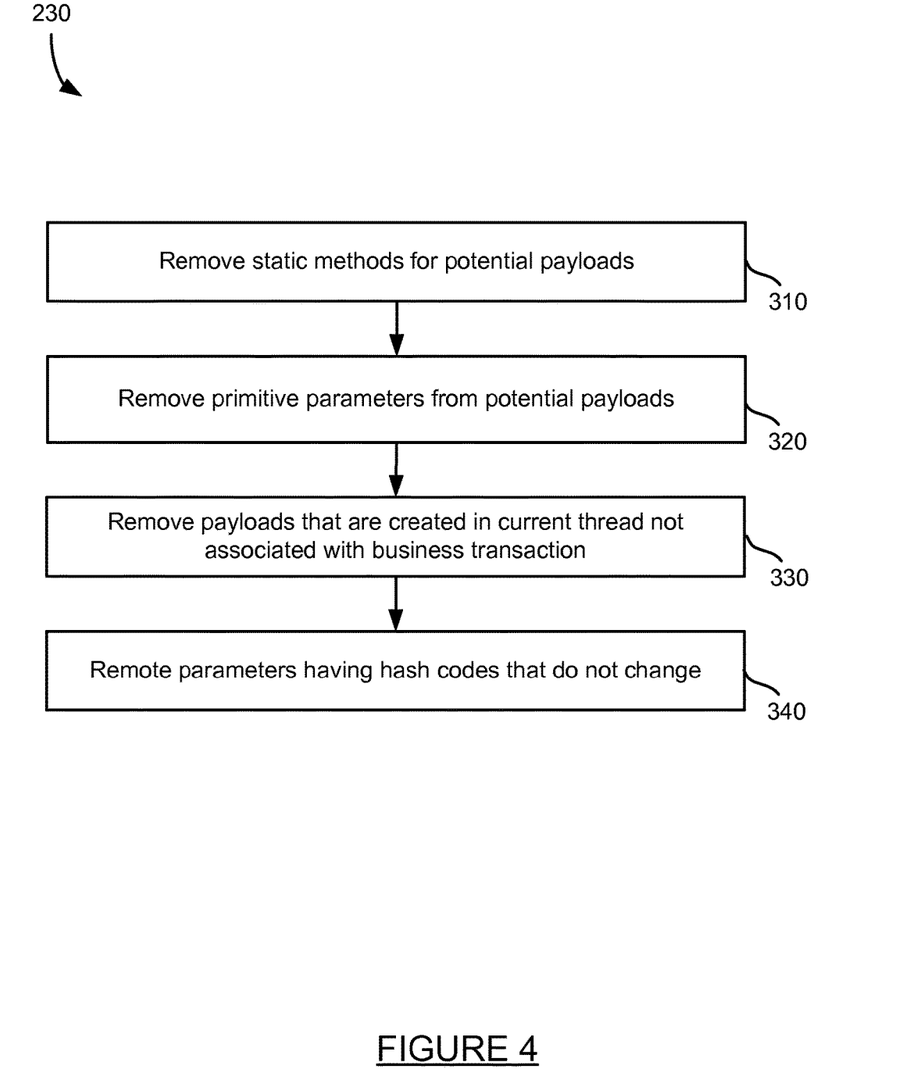
FIG. 4 illustrates a method for filtering potential payloads.

FIG. 4 illustrates a method for filtering potential payloads. The method of FIG. 4 provides more detail for step 230 of the method of FIG. 2. Static methods are removed from the set of potential payloads at step 410. Static methods include methods that may be accessed without an instance present. Primitive parameters may be removed from the set of potential payloads at step 420. Primitive payloads may include basic data types such as bytes, integers, Boolean, and other basic data types.

Payloads that are created within the thread being tracked are removed at step 430. Payloads created in the present thread are already known and therefore cannot be used to correlate the present thread with a different thread associated with a business. Parameters with hash codes that do not change are removed at step 440. If the hash code does not change, the payload is associated with the same object and is not of interest. If the hash code does change, then it is desirable to track that particular object.

The filters discussed with respect to FIG. 4 are intended as examples. Additional filters may be used to identify real objects as potential payloads for monitoring and ultimately to correlate the present thread to a task object creator or payload creator associated with another thread and corresponding business transaction.

Figure 5:
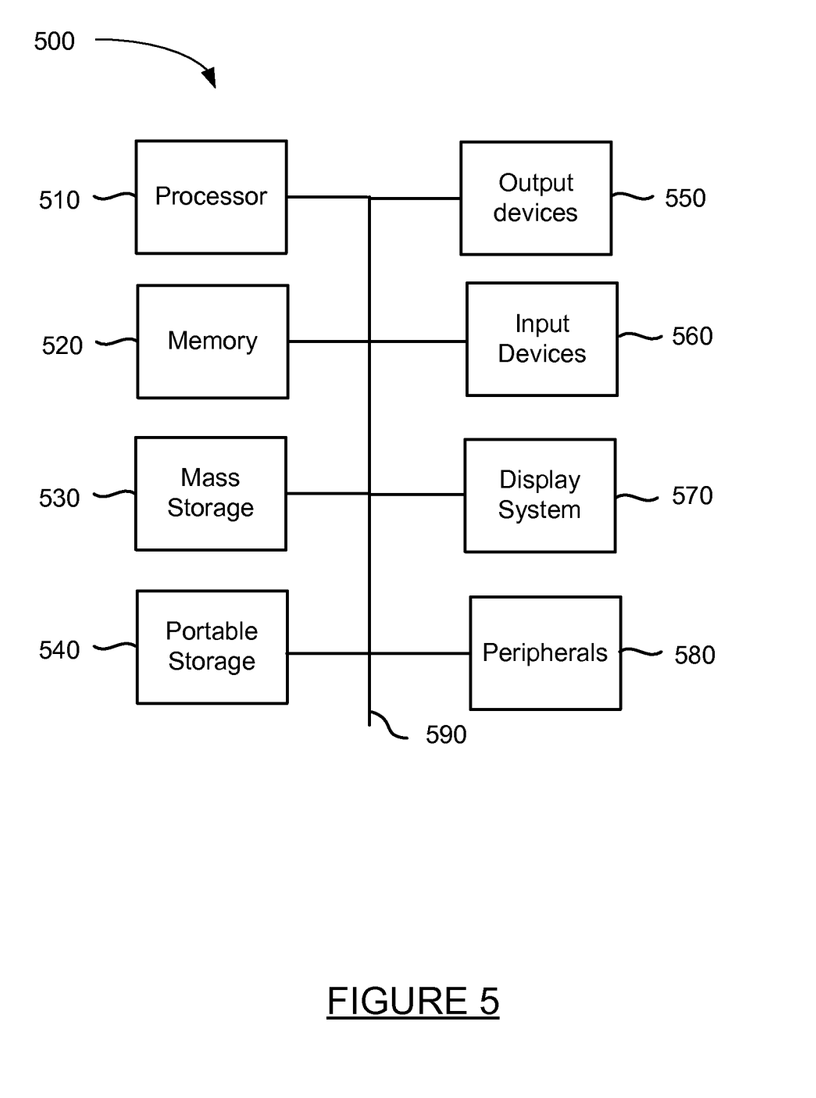
FIG. 5 illustrates a block diagram of a computing environment for use with the present technology.

FIG. 5 is a block diagram of an exemplary computing system for implementing the present technology. System 500 of FIG. 5 may be implemented in the contexts of the likes of client computer 105, servers 130, 140, and 150, controller 190 and client device 192. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, and other suitable operating systems.

The computer system of FIG. 5 may include additional elements commonly found in mobile devices such as smart phones and tablet computers which enable such devices to communicate with users, Wi-Fi networks, cellular networks, and so on. These elements may include antennas, radios, touch displays, keypads, NFC circuitry, and other components, though not illustrated in FIG. 5.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for tracking a task in a distributed business transaction, comprising:
   detecting, by an agent executed by a server, a thread that is not associated with any business transaction, wherein the thread is executed as part of an application associated with the distributed business transaction;
   in response to detecting the thread, identifying, by the agent, a set of payloads in the thread;
   filtering, by the agent, the set of payloads to identify one or more payloads of the set of payloads to be tracked;
   identifying, by the agent, a constructor associated with each of the one or more payloads;
   instrumenting, by the agent, each constructor of the one or more payloads;
   based on the instrumenting, identifying, by the agent, whether any other thread of an instrumented constructor constructs a task object associated with the filtered payload; and
   correlating, by the agent, the detected thread to a business transaction assigned to the other threads associated with the filtered payload.

2. The method of claim 1, wherein identifying the set of payloads includes collecting stack trace information.

3. The method of claim 2, wherein identifying the set of payloads includes identifying a chain of calls from the stack trace information.

4. The method of claim 3, further comprising instrumenting potential entry point methods in the chain of calls associated with the stack trace information.

5. The method of claim 4, wherein a potential entry point and the task object of the detected thread are correlated after a user approves a proposed correlation of the potential entry point and the task object.

6. The method of claim 1, further comprising:
   determining there is no correlation between any one of the set of payloads and any task; and
   naming a business transaction after a part of a call chain associated with the set of payloads.

7. A non-transitory computer readable storage medium having embodied thereon a program, the program being executable as an agent by a processor to perform a method for tracking a task in a distribute business transaction, the method comprising:

detecting a thread that is not associated with any business transaction, wherein the thread is executed as part of an application associated with the distributed business transaction;

in response to detecting the thread, identifying a set of payloads in the thread;

filtering the set of payloads to identify one or more payloads of the set of payloads to be tracked;

identifying a constructor associated with each of the one or more payloads;

instrumenting each constructor of the one or more payloads;

based on the instrumenting, identifying whether any other thread of an instrumented constructor constructs a task object associated with the filtered payload; and correlating the detected thread to a business transaction assigned to the other threads associated with the filtered payload.

8. The non-transitory computer readable storage medium of claim 7, wherein identifying the set of payloads includes collecting stack trace information.

9. The non-transitory computer readable storage medium of claim 8, wherein identifying the set of payloads includes identifying a chain of calls from the stack trace information.

10. The non-transitory computer readable storage medium of claim 9, the method further comprising instrumenting potential entry point methods in the chain of calls associated with the stack trace information.

11. The non-transitory computer readable storage medium of claim 10, wherein the potential entry point and task object are correlated after a user approves a proposed correlation of the potential entry point and task object.

12. The non-transitory computer readable storage medium of claim 7, further comprising:

determining there is no correlation between any one of the set of payloads and any task; and naming a business transaction after a part of a call chain associated with the set of payloads.

13. A system for tracking a task in a distributed business transaction, comprising:

a server including a memory and a processor; and one or more modules stored in the memory and executed by the processor, wherein the one or more modules include an agent configured:

detect a thread that is not associated with any business transaction, wherein the thread is executed as part of an application associated with the distributed business transaction;

in response to detecting the thread, identify a set of payloads in the thread;

filter the set of payloads to identify one or more payloads of the set of payloads to be tracked;

identify a constructor associated with each of the one or more payloads;

instrument each constructor of the one or more payloads;

based on the instrumentation, identify whether any other thread of an instrumented constructor constructs a task object associated with the filtered payload; and correlate the detected thread to a business transaction assigned to the other threads associated with the filtered payload.

14. The system of claim 13, wherein identifying the set of payloads includes collecting stack trace information.

15. The system of claim 14, wherein identifying the set of payloads includes identifying a chain of calls from the stack trace information.

16. The system of claim 15, the one or more modules executable to instrument potential entry point methods in the chain of calls associated with the stack trace information.

17. The system of claim 16, wherein the potential entry point and the task object are correlated after a user approves a proposed correlation of the potential entry point and task object.

18. The system of claim 13, the one or more modules executable to:

determine there is no correlation between any one of the set of payloads and any task; and name a business transaction after a part of a call chain associated with the set of payloads.

* * * * *